April 19, 1960  R. E. GIBONEY ET AL  2,933,626
SAMPLE DATA CONTROL APPARATUS
Filed Oct. 22, 1958  2 Sheets-Sheet 1

WITNESSES
John E. Heanley, Jr.
James F. Young

INVENTORS
Ray E. Giboney &
George E. King
BY N.J.Brodahl
ATTORNEY

United States Patent Office 2,933,626
Patented Apr. 19, 1960

2,933,626

SAMPLE DATA CONTROL APPARATUS

Ray E. Giboney, Amherst, and George E. King, Eggertsville, N.Y., assignors to Westinghouse Electric Corporation, East Pittsburgh, Pa., a corporation of Pennsylvania Application October 22, 1958, Serial No. 768,956

8 Claims. (Cl. 307—117)

The present invention relates, in general, to sample data control apparatus, and more particularly, to sample data control apparatus for controlling the operation of a motor or like device and having a predetermined and adjustable On sample control period and a predetermined and adjustable Off sample control period.

It is an object of the present invention to provide improved signal sampling control apparatus that is faster in operation and utilizes static devices such that less maintenance is required than with prior art devices.

It is a different object to provide improved signal or data sampling control apparatus operative to provide a predetermined On sampling time period and to provide a predetermined Off sampling time period relative to controlling the operation of a control member for a motor or like device.

It is an additional object of the present invention to provide improved sampling apparatus that is responsive to an adjustable input signal corresponding to a predetermined error condition and which apparatus is operative to sample said input signal for a predetemined On time period and then subsequently provide an Off time period when no sampling is done such that the correction resulting from the On time period is allowed to become effective relative to said error condition.

Figure 1:
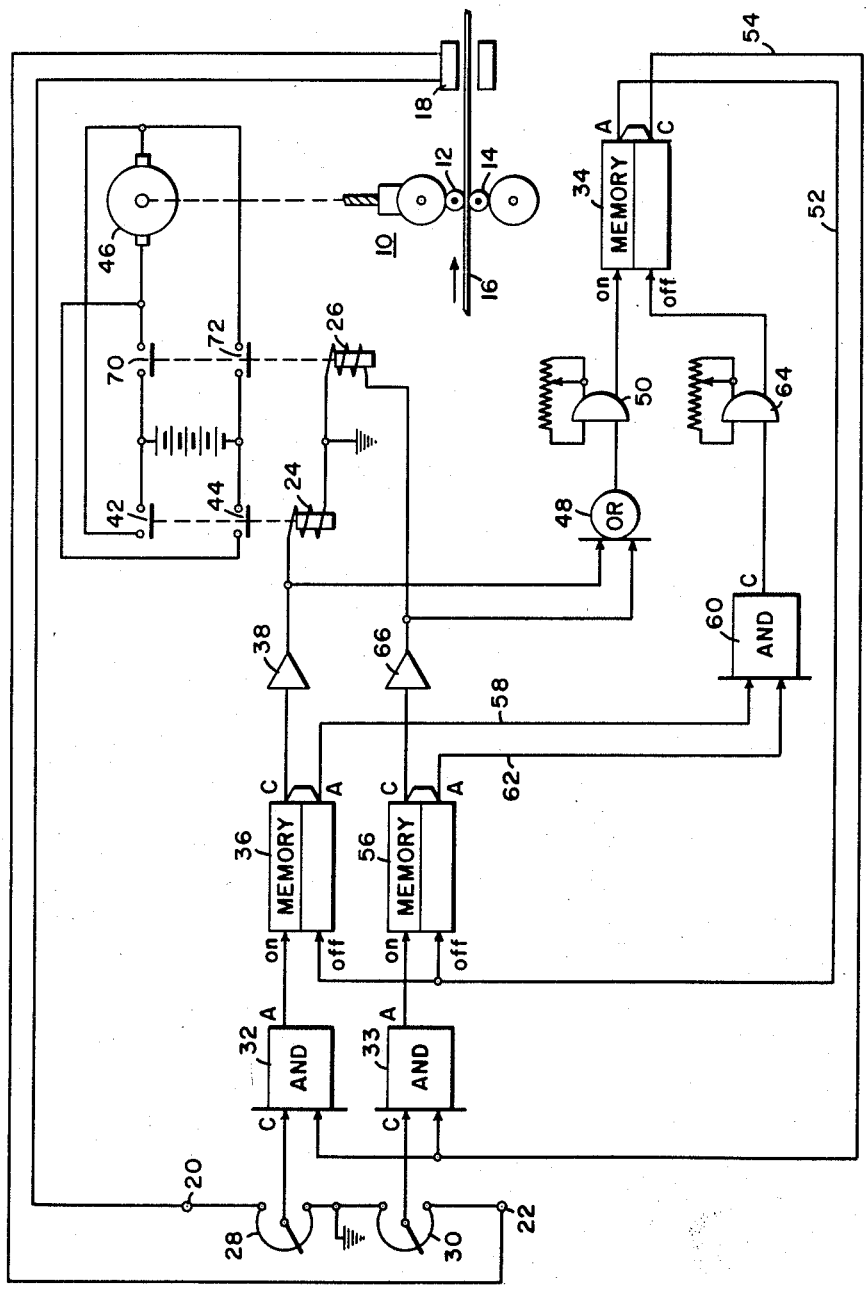
Figure 2:
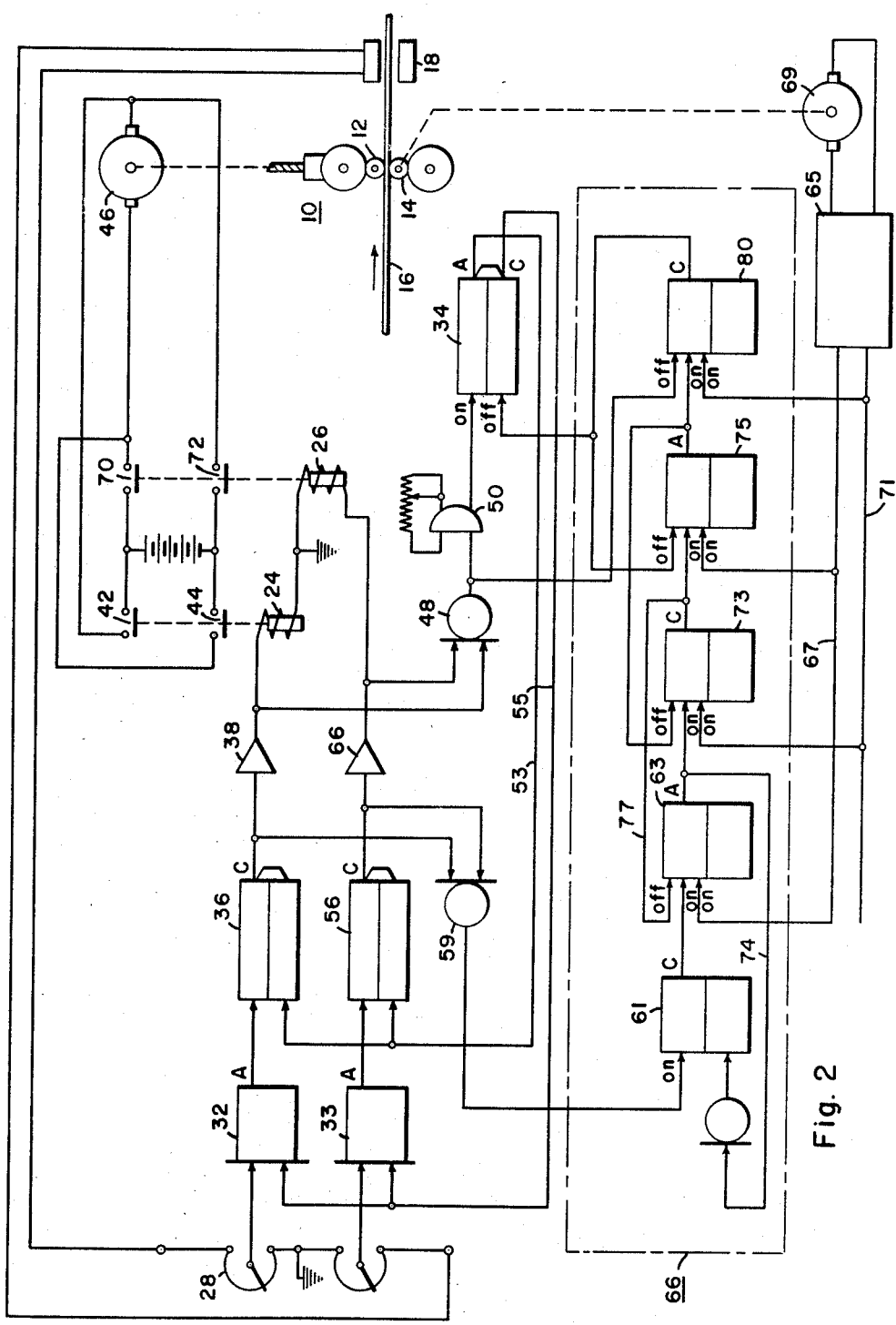

In Figure 1 there is shown a first modification of the present control apparatus, and in Fig. 2 there is shown a second modification of the present control apparatus.

The present signal sampling apparatus may be operative in conjunction with a metal strip rolling mill or like device for automatically controlling the strip gauge or thickness by suitable adjustment of the rolling mill screwdown control mechanism. The present control apparatus is operative to sense or respond to the presence of an error condition in the strip thickness or gauge as indicated by the presence of an error signal, which is supplied as the input signal to be sampled by the present control apparatus. When this error signal has an adjustable predetermined minimum value, the present control apparatus is operative to jog or adjust the screwdown setting for a predetermined and adjustable sampling On time period, with the direction of the jog or correction to the screwdown mechanism depending upon whether the error condition is above or below a predetermined and desired reference strip thickness or gauge. At the end of the predetermined On sampling time period, the present control apparatus stops the movement of the screwdown mechanism and causes said screwdown mechanism to remain stopped for a predetermined and adjustable Off or no sampling time period to allow the correction of the screwdown to become effective relative to correcting the error in the strip thickness, and further to allow any desired transport time delay periods for such strip thickness correction to move to the position of the thickness sensing or measurement apparatus as may be provided. After the predetermined Off or no sampling time period has passed, then an On or sampling time period is again provided such that any resulting or remaining strip thickness error condition may be corrected during the additional On or sampling time period provided.

The present control apparatus is cyclically operable in this regard such that repetitive On and Off operating time cycles or time periods are thus provided. In the event that the error condition is corrected such that the actual strip thickness is in accordance with predetermined desired strip thickness, then during the On or sampling time period no correction is made to the screwdown setting in that the input signal supplied to the present control apparatus is not sufficient and adequate to cause a jogging or movement of the screwdown mechanism relative to the rolls of the mill for correcting the thickness of the strip.

In Fig. 1 there is shown a strip rolling mill 10 including an upper roller 12 and a lower roller 14 operative for determining the thickness or gauge of a strip 16 passing through the rolling mill in the direction indicated by the arrow. A strip thickness measuring device 18 is provided at the output side of the rolling mill 10, which measuring device 18 may comprise an X-ray thickness measuring device or similar well known and conventional prior art strip thickness measuring device. An output signal is provided from the measuring device 18 and supplied to the terminals 20 and 22 at the input of the signal sampling apparatus shown in Fig. 1. Depending upon the polarity of this input signal, either an up relay control winding 24 or a down relay control winding 26 will be energized and further assuming that the magnitude of the input signal is above a predetermined magnitude as determined by the settings of the adjustable taps on the potentiometers 28 and 30.

For the purpose of illustration and assuming that the strip thickness error signal as supplied to the terminals 20 and 22 corresponds to a strip thickness below a predetermined desired value such that it is desirable that the spacing between the roller members 12 and 14 be increased to thereby increase the thickness of the strip 16, an error signal will be supplied by the strip thickness measurement device 18 to the terminals 20 and 22 having a positive value relative to ground potential such that a first control signal will be supplied to one input of the And control device 32. The And control device is operative such that when both of its said inputs as indicated are simultaneously energized, it will provide an output signal. The second input of the And device 32 is energized by the C-phase output of the Memory device 34 which latter device is now operating in its Off condition of operation such that it provides from its Off output through conductor 54 a C-phase signal. Since both inputs of the And device 32 are now simultaneously energized with C-phase signals, the And device 32 will provide an A-phase output signal, which A-phase signal is 180° out of phase relative to the C-phase signal.

The A-phase output signal from the And device 32 is supplied to a Memory device 36 and causes said Memory device 36 to operate in its On condition to have a C-phase output signal which is supplied through an amplifier device 38 to energize the Up relay control winding 24 operative with the Up contact members 42 and 44 for energizing the screwdown motor 46 such that the spacing between the roll members 12 and 14 is effectively increased to thereby increase the thickness of the strip 16.

The output signal from the amplifier device 38 is also supplied through an Or device 48 to a time delay device 50 having a predetermined time delay after which time delay the device 50 provides an output signal to energize the On input of the Memory device 34. The Memory device 34 now operates in its On condition to provide an A-phase signal through the conductor 52 and no longer provides the C-phase output signal through the conductor 54. The A-phase signal supplied through the conductor 52 energizes the Off input of Memory device 36 and also energizes the Off input of Memory device 56 to cause the latter devices to operate in the Off condition.

The Memory device 36 operating in its Off condition now terminates the On output signal supplied to the amplifier device 38 and instead provides an A-phase Off output signal through the conductor 58 to one input terminal of an And device 60. The Memory device 56 similarly now supplies an A-phase Off output signal through the conductor 62 to the second input of the And device 60, such that the And device 60 now provides a C-phase output signal to the time delay device 64 which, after a predetermined time delay period, provides an output signal to energize the Off input of the Memory device 34 to cause the Memory device 34 to operate in its Off condition to effectively terminate the On output signal previously supplied through the conductor 52 and to initiate the supply of an Off output signal through the conductor 54. Thusly, the Off inputs of the Memory devices 36 and 56 are now no longer energized by the control signal through the conductor 52 and, instead, one input of each of the And devices 32 and 33 is energized by the C-phase Off output signal from the Memory device 34 through the conductor 54.

If the input error signal is still present after the screwdown motor 46 was operated as previously described, and is of sufficient magnitude as determined by the setting of the potentiometer 28 to again energize the first input of the And device 32, then the And device 32 again provides an output signal since both of its inputs are thereby energized. Such an output signal energizes the On input of the Memory device 36 such that the Memory device 36 again provides an output signal to again energize the Up control winding 24 to cause the screwdown motor 46 to again operate the screwdown mechanism to increase the spacing between the roll members 12 and 14.

If, for example, the actual thickness of the strip as sensed by the measuring device 18 is greater than the predetermined desired thickness and is greater by an amount larger than the setting of the potentiometer 30, then a D.-C. control signal is applied to the And device 33 simultaneous to the C-phase control signal applied through the conductor 54 by the Memory device 34 to the second input of the And device 33. An A-phase output signal is then supplied by the And device 33 to the On input of the Memory device 56 to cause the Memory device 56 to switch to its On condition such that a C-phase output signal is supplied through the amplifier device 66 and the Down relay control winding 26 to result in closing the contactors 70 and 72 and causing the screwdown motor 46 to operate in a direction to decrease the spacing between the roller members 12 and 14. The output signal from the Memory device 56 also passes through the Or device 48 and causes the time delay device 50 to provide an output signal after its predetermined time delay period, which output signal causes the Memory device 34 to switch to its On condition and provide an A-phase output signal through the conductor 52. The latter signal switches the Memory device 56 to its Off operating condition to thereby terminate the C-phase output signal supplied through the amplifier device 66 to the Down relay control winding 26. When the Memory device 34 switches to its On operating condition, the Off operating condition output signal is no longer applied through the conductor 54 to the inputs of the And devices 32 and 33.

The Off operating condition output signal from the Memory device 56 is now supplied through the conductor 62 to the And device 60. Since the Memory device 36 is also now operating in the Off condition it provides an output signal through the conductor 58 to the other input of the And device 60. Thusly, the latter And device 60 has an output signal which passes through the time delay device 64 and after a predetermined Off time period causes the Memory device 34 to switch to its Off operating condition at which time the output signal through the conductor 52 terminates and a C-phase output signal is again supplied through the conductor 54. Thusly, as determined by the time period of the respective time delay devices 50 and 64, the operation of the Memory device 34 periodically switches between an On operating condition and an Off operating condition. During the On operating condition, an A-phase output signal is supplied through the conductor 52 to terminate the operation of the respective Memory devices 36 and 56. During the Off operating condition of the Memory device 34, a C-phase control signal is supplied through the conductor 54 to the And devices 32 and 33. Thusly, when the Memory device 34 is in its Off operating condition, the signal sampling apparatus in accordance with the present invention, as shown in Fig. 1, is operative to control the operation of one of the relay control windings 24 and 26. During the On operating condition of the Memory device 34, the signal sampling apparatus, as shown in Fig. 1, is made inoperative relative to sampling the applied input signal from some suitable input signal source such as the strip thickness measuring device 18. It should be here understood that a Memory device may in fact be and is well known in this art as a Flip-Flop device.

In Fig. 2 there is shown a modification of the control apparatus in accordance with the present invention wherein a shift register or similar type of counter device 65 is provided for controlling the Off operating condition of the Memory device 34 such that when either one of the Memory devices 36 or 56 becomes operative in their On operating condition, such that an output signal is provided to energize the Up relay control winding 24 by the Memory device 36 or to energize the Down relay control winding 26 by the Memory device 56, an output control signal is applied through the Or device 48 to each of the time delay devices 50 and the Off controlling input of the Flip-Flop device 80 within the shift register 66. This energizes the Off controlling input of the Flip-Flop device 80 to terminate any output signal applied thereby to the Off controlling input of the Memory device 34. After the time delay period is provided by the time delay device 50, the Memory device 34 switches to its On condition of operation to provide an A-phase signal through the conductor 53 to switch Off the above mentioned one of the Memory devices 36 and 56; also this terminates the signal applied through conductor 55 to each of the And devices 32 and 33.

Concurrently to the above operation with the Or device 48, the same output signal from said one Memory device is applied through the Or device 59 to the On operation controlling input of the Flip-Flop device 61 to result in a C-phase signal being applied to one of the two On operation controlling inputs of the Flip-Flop device 63. The other of the latter two inputs is energized by a C-phase signal supplied by a suitable switching device 66 to a conductor 67 connected to said other input.

A pilot generator 69 or like device is operative with one of the mill rollers 12 and 14, for example the lower roller 14, to provide an indication of the rotation of said lower roller 14 and thereby the movement of the strip 16. If the measuring device 18 is positioned relative to the mill stand 10 such that a given portion of the strip 16 must move for a distance corresponding to two revolutions of the lower roller 14 before it reaches the measuring device, then the pilot generator 69 will provide through the switch device 65, which may be a well known phase sensitive diode circuit wherein a first diode is conductive to conductor 67 for phase C and a second diode is conductive to conductor 71 for phase A, alternate signals to each of conductors 67 and 71.

When each of the two On controlling inputs of Flip-Flip device 63 are simultaneously energized, an A-phase output signal is applied through the conductor 74 to the Off input of Flip-Flop device 61 and to one of the two On controlling inputs of the next Flip-Flop device 73; and the signal from the conductor 71 energizes the other of these inputs to cause the Flip-Flop device 73 to have a C-phase output signal. The latter signal energizes one of the two On controlling inputs of the Flip-Flop device 75 and also through the conductor 77 energizes the Off controlling input of the Flip-Flop device 63. In a similar manner, the Flip-Flop 75 upon receipt of the C-phase signal from the conductor 67 is operative to energize one On controlling input of the Flip-Flop device 80, and the other such input is energized by the A-phase signal from the conductor 71 when it occurs due to the rotation of the lower roller 14. This causes the Flip-Flop device 75 to have an output signal which energizes one On input of the Flip-Flop device 80, and also energizes the Off input of the Flip-Flop device 73. The other On input of the Flip-Flop device 80 when now energized by the A-phase signal from the conductor 71 causes the Flip-Flop device 80 to have an output signal that turns Off the previous Flip-Flop device 75 and also turns Off the Memory device 34 to again energize the one input of each And device 32 and 33 to provide another error signal sampling period, as has been previously described.

The operation of the shift register 66 per se is well known to persons skilled in this particular art.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

We claim as our invention:

1. In input signal sampling apparatus operative with a control member, the combination of a time control device for providing a first control signal having a time duration in accordance with a predetermined desired sampling time period, first control means responsive to each of said input signal and said first control signal for providing a second control signal when each of said first control signal and said input signal are simultaneously present, second control means operatively connected between said first control means and said control member and responsive to said second control signal for providing a third control signal to energize said control member, with said time control device being operatively connected to said second control means and responsive to said third control signal for controlling the time duration of at least one of said first and second control signals.

2. In input signal sampling apparatus operative with a control member, the combination of a timing device for providing a first control signal having a time duration in accordance with a predetermined desired sampling time period, and And control device responsive to each of said input signal and said first control signal and operative to provide a second control signal when each of said first control signal and said input signal are simultaneously applied to said And control device, a first Memory control device operatively connected between said And control device and said control member and responsive to said second control signal for providing a third control signal to energize said control member, with said timing device including a second Memory control device operatively connected to said first Memory control device and responsive to said third control signal for providing a fourth control signal to terminate the third control signal from said first Memory control device.

3. In sampling control apparatus operative with a control member, the combination of a time control device for providing a first control signal at the beginning of a predetermined desired sampling On time period, first control means responsive to each of said input signal and said first control signal for providing a second control signal when each of said first control signal and said input signal are simultaneously provided, second control means operatively connected between said first control means and said control member and responsive to said second control signal for providing a third control signal to energize said control member, with said time control device being operatively connected to said second control means and responsive to said third control signal for providing a fourth control signal at the end of said predetermined desired sampling On time period, with said second control means being responsive to said fourth control signal for providing a fifth control signal, and with said time control device being responsive to said fifth control signal for again providing said first control signal at the beginning of another predetermined desired sampling On time period.

4. In sampling control apparatus operative with a control member, the combination of a time control device for providing a first control signal at the beginning of a predetermined desired sampling On time period, first control means including an And device responsive to each of said input signal and said first control signal for providing a second control signal when each of said first control signal and said input signal are simultaneously provided, second control means including a Flip-Flop device operatively connected between said first control means and said control member and responsive to said second control signal for providing a third control signal to energize said control member, with said time control device being operatively connected to said second control means and responsive to said third control signal for providing a fourth control signal at the end of said predetermined desired sampling On time period, with said second control means being responsive to said fourth control signal for providing a fifth control signal, and with said time control device being responsive to said fifth control signal for again providing said first control signal at the beginning of another predetermined desired sampling On time period.

5. In sampling control apparatus operative with a control member, the combination of a time control device including a first Flip-Flop device for providing a first control signal at the beginning of a predetermined desired sampling On time period, first control means including an And device responsive to each of said input signal and said first control signal for providing a second control signal when each of said first control signal and said input signal are simultaneously present, second control means including a second Flip-Flop device operatively connected between said first control means and said control member and responsive to said second control signal for providing a third control signal to energize said control member, with said time control device being operatively connected to said second control means and responsive to said third control signal for providing a fourth control signal at the end of said predetermined desired sampling On time period, with said second control means being responsive to said fourth control signal for providing a fifth control signal, and with said time control device being responsive to said fifth control signal for again providing said first control signal at the beginning of another predetermined desired sampling On time period.

6. In sampling control apparatus operative with a control member, the combination of a time control device for providing a first control signal at the beginning of a predetermined desired sampling On time period, first control means responsive to each of said input signal and said first control signal for providing a second control signal when each of said first control signal and said input signal are simultaneously provided, second control means operatively connected between said first control means and said control member and responsive to said second control signal for providing a third control signal to energize said control member, with said time control device being operatively connected to said second control means and responsive to said third control signal for providing a fourth control signal at the beginning of a predetermined desired sampling Off time period, with said second control means being responsive to said fourth control signal for providing a fifth control signal, and with said time control device being responsive to said fifth control signal for again providing said first control signal at the beginning of another predetermined desired sampling On time period.

7. In sampling control apparatus operative with a control member, the combination of a time control device for providing a first control signal at the beginning of a predetermined adjustable desired sampling On time period, first control means responsive to each of said input signal and said first control signal for providing a second control signal when said first control signal and said input signal are simultaneously provided, second control means operatively connected between said first control means and said control member and responsive to said second control signal for providing a third control signal to energize said control member, a second time control device being operatively connected to said second control means and responsive to said third control signal for providing a fourth control signal at the end of said predetermined desired sampling On time period, with said second control means being responsive to said fourth control signal for providing a fifth control signal, and with said first time control device being responsive to said fifth control signal for again providing said first control signal at the beginning of another predetermined desired sampling On time period.

8. In input signal sampling apparatus operative with a control member, the combination of a first time control device for providing a first control signal having a time duration in accordance with a first predetermined desired sampling control period, first control means responsive to each of said input signal and said first control signal for providing a second control signal when said first control signal and said input signal are provided and for the time duration of said first control signal, second control means operatively connected between said first control means and said control member and responsive to said second control signal for providing a third control signal to energize said control member for the time duration of said first control signal, and a second time control device including a signal counter device responsive to said third control signal and operatively connected to said control member for providing to said first time control device a fourth control signal in accordance with the operation of said control member for terminating said first control signal.

No references cited.